US012711194B2

(12) United States Patent
Nguyen

(10) Patent No.: US 12,711,194 B2
(45) Date of Patent: Aug. 18, 2026

(54) CUSTOM INTERFACES BASED ON GENERATIVE SYSTEMS AND METHODS

(71) Applicant: T-Mobile USA, Inc., Bellevue, WA (US)

(72) Inventor: Phi Hoang Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 253 days.

(21) Appl. No.: 18/741,495

(22) Filed: Jun. 12, 2024

(65) Prior Publication Data

US 2025/0384101 A1 Dec. 18, 2025

(51) Int. Cl.

| | |
|---|---|
| ***G06F 3/00*** | (2006.01) |
| ***G06F 16/957*** | (2019.01) |
| ***G06F 16/958*** | (2019.01) |
| *G06F 3/01* | (2006.01) |

(52) U.S. Cl.

CPC ........ *G06F 16/958* (2019.01); *G06F 16/9577* (2019.01)

(58) Field of Classification Search

None

See application file for complete search history.

(56) References Cited

U.S. PATENT DOCUMENTS

| | | | |
|---|---|---|---|
| 7,027,997 | B1 | 4/2006 | Robinson et al. |
| 7,490,167 | B2 | 2/2009 | Pena et al. |
| 7,596,577 | B2 | 9/2009 | Coulombe |
| 7,603,657 | B2 | 10/2009 | Gassner et al. |
| 7,650,572 | B2 | 1/2010 | Olander et al. |
| 8,112,714 | B2 | 2/2012 | Fleishman et al. |
| 9,645,719 | B2 | 5/2017 | Zhang et al. |
| 9,753,703 | B2 | 9/2017 | Jemiolo |
| 9,753,902 | B2 | 9/2017 | Dalal et al. |
| 9,953,011 | B1 | 4/2018 | Anderson et al. |
| 10,126,918 | B2 | 11/2018 | Sharma et al. |
| 10,248,387 | B2 | 4/2019 | Bharthulwar |
| 10,291,942 | B2 | 5/2019 | Viles et al. |

(Continued)

FOREIGN PATENT DOCUMENTS

| | | | |
|---|---|---|---|
| EP | 2924962 | A1 | 9/2015 |
| EP | 3944070 | A1 | 1/2022 |

(Continued)

*Primary Examiner* — Toan H Vu

(74) *Attorney, Agent, or Firm* — Ashurst Perkins Coie US LLP

(57) ABSTRACT

Systems and methods are disclosed comprising instructions to identify a user of a mobile device based on an interaction of the user on a communications network, retrieve from a database an aggregated history of activity of the user with the service on the communications network, receive a request to access a first page on the mobile device belonging to a set of pages that is formed of page elements that are linkable to each other as a sequence of pages, and in response to the request to access the first page on the mobile device, dynamically select a second page of the set of pages, generate a personalized page element for the second page, integrate the personalized page element into the second page to generate a personalized second page, and link the personalized second page to the first page, the second page being accessible as a next page of the first page.

20 Claims, 11 Drawing Sheets

(56) References Cited

U.S. PATENT DOCUMENTS

| | | | | |
|---|---|---|---|---|
| 10,306,174 | B1 * | 5/2019 | Grafton | G06F 3/04883 |
| 10,353,534 | B2 | 7/2019 | Grammatikakis et al. | |
| 10,540,151 | B1 | 1/2020 | Righi et al. | |
| 10,592,077 | B1 | 3/2020 | Goldstein et al. | |
| 11,106,569 | B1 | 8/2021 | Chapagain et al. | |
| 11,621,862 | B1 | 4/2023 | Park et al. | |
| 11,870,860 | B2 | 1/2024 | Peddada et al. | |
| 11,924,489 | B2 | 3/2024 | Grace | |
| 11,936,805 | B2 | 3/2024 | Lemley et al. | |
| 2002/0059278 | A1 | 5/2002 | Bailey et al. | |
| 2003/0145305 | A1 | 7/2003 | Ruggier | |
| 2004/0189718 | A1 | 9/2004 | Stein et al. | |
| 2005/0147054 | A1 | 7/2005 | Loo et al. | |
| 2006/0100011 | A1 | 5/2006 | Morrow et al. | |
| 2007/0180066 | A1 | 8/2007 | Sherwood et al. | |
| 2008/0189680 | A1 | 8/2008 | Brown et al. | |
| 2010/0185973 | A1 | 7/2010 | Ali et al. | |
| 2011/0029575 | A1 | 2/2011 | Sagi et al. | |
| 2014/0082511 | A1 | 3/2014 | Weissberg et al. | |
| 2014/0245368 | A1 | 8/2014 | Park et al. | |
| 2015/0277736 | A1 | 10/2015 | Graber et al. | |
| 2017/0250930 | A1 * | 8/2017 | Ben-Itzhak | G06F 3/0488 |
| 2018/0036591 | A1 * | 2/2018 | King | H04N 5/76 |
| 2018/0053233 | A1 * | 2/2018 | Srivastava | G06Q 30/0625 |
| 2018/0157386 | A1 | 6/2018 | Su | |
| 2019/0219415 | A1 * | 7/2019 | Wang | G01C 21/3682 |
| 2019/0302975 | A1 * | 10/2019 | Rydzewski | G06F 16/9535 |
| 2020/0327564 | A1 | 10/2020 | Simard et al. | |
| 2021/0027645 | A1 | 1/2021 | Nicol | |
| 2022/0188716 | A1 * | 6/2022 | Mathieu | G16H 50/30 |
| 2022/0270163 | A1 | 8/2022 | Modaragamage | |
| 2022/0300942 | A1 | 9/2022 | Akgün et al. | |
| 2023/0177254 | A1 * | 6/2023 | Ding | G06F 16/958 715/229 |
| 2023/0214440 | A1 | 7/2023 | Hernandez et al. | |
| 2023/0351479 | A1 | 11/2023 | Sidhu et al. | |
| 2023/0403282 | A1 | 12/2023 | Smith et al. | |
| 2024/0005328 | A1 * | 1/2024 | Smets | H04L 9/3231 |
| 2024/0126927 | A1 | 4/2024 | Lim et al. | |
| 2024/0217111 | A1 * | 7/2024 | Kuk | B25J 11/0005 |
| 2024/0257124 | A1 * | 8/2024 | Kolchin | G06N 20/00 |

FOREIGN PATENT DOCUMENTS

| | | | |
|---|---|---|---|
| WO | 03044654 | A2 | 5/2003 |
| WO | 2014148775 | A1 | 9/2014 |
| WO | 2015025189 | A1 | 2/2015 |
| WO | 2015036817 | A1 | 3/2015 |
| WO | 2015044706 | A1 | 4/2015 |
| WO | 2015159131 | A1 | 10/2015 |
| WO | 2016189350 | A1 | 12/2016 |
| WO | 2017026850 | A1 | 2/2017 |
| WO | 2019008343 | A2 | 1/2019 |
| WO | 2020222325 | A1 | 11/2020 |
| WO | 2021196968 | A1 | 10/2021 |

* cited by examiner

Large Language Model (LLM) 280

Determine Page Layout Update Recommendations

Retrieve Current Page Layout

Interface Template Database 270

Identify Interface Dependencies

Determine Affected Interface Elements

Generate Updated Page Layout

Functional Integration Module 228

Page Generation Module 224

Flow Generation Module 226

Store Dynamic Content Changes

Update Interface Workflow Based on Updated Page Layout

Functional Component Database 260

External Monitor 240

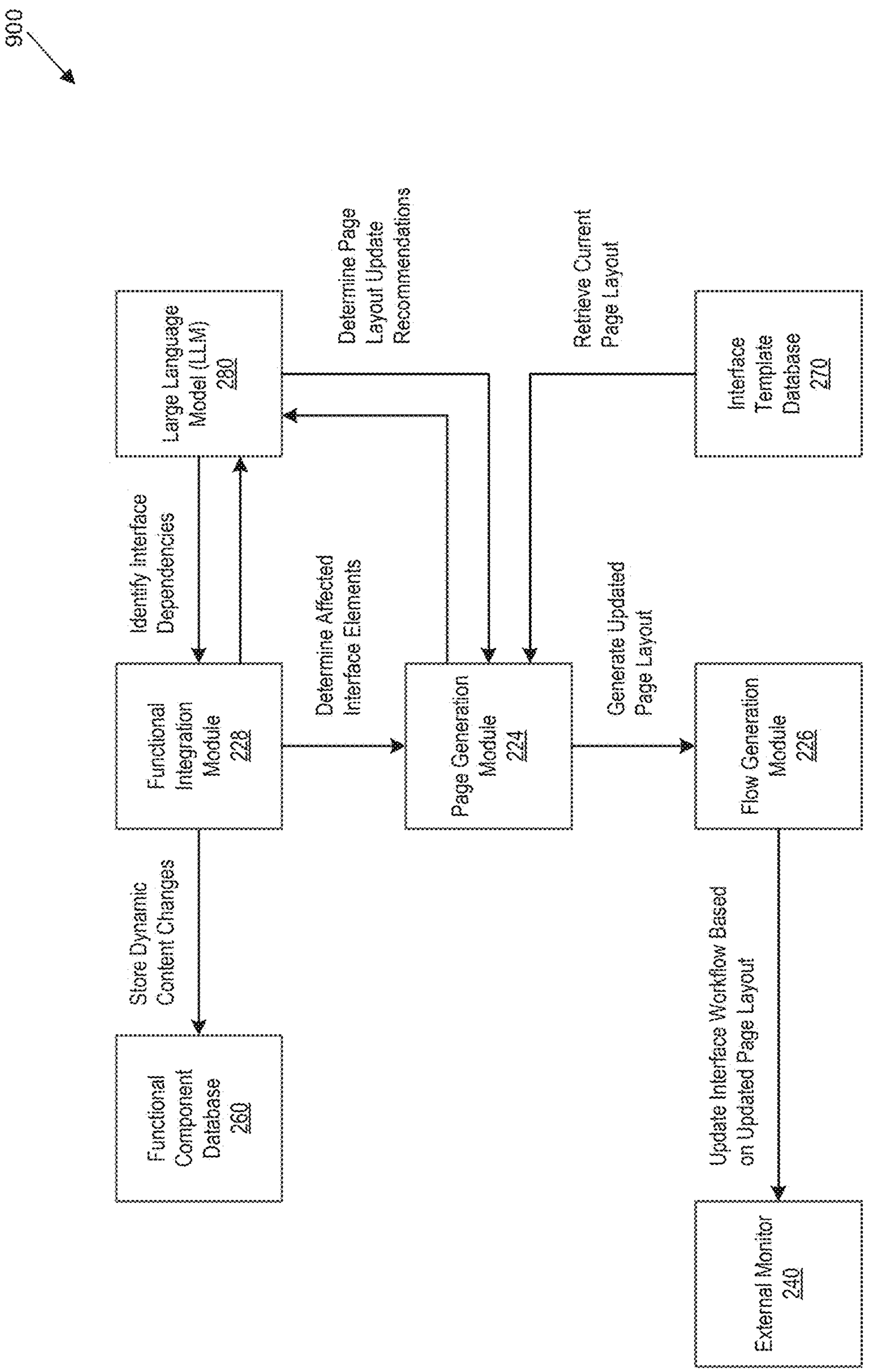

*FIG. 9*

CUSTOM INTERFACES BASED ON GENERATIVE SYSTEMS AND METHODS

BACKGROUND

A large language model (LLM) is a language model notable for its ability to achieve general-purpose language understanding and generation. LLMs acquire these abilities by learning statistical relationships from text documents during a computationally intensive self-supervised and semi-supervised training process. LLMs can be used for text generation, a form of generative artificial intelligence (GenAI), by taking an input text and repeatedly predicting the next token or word.

Generative artificial intelligence (AI) is a machine learning paradigm capable of generating text, images, videos, or other data using generative models, often in response to prompts. Generative AI models learn the patterns and structure of their input training data and then generate new data that has similar characteristics.

BRIEF DESCRIPTION OF THE DRAWINGS

Detailed descriptions of implementations of the present invention will be described and explained through the use of the accompanying drawings.

FIG. 9 is a block diagram that illustrates a process to propagate functional updates in some implementations.

Figure 1:
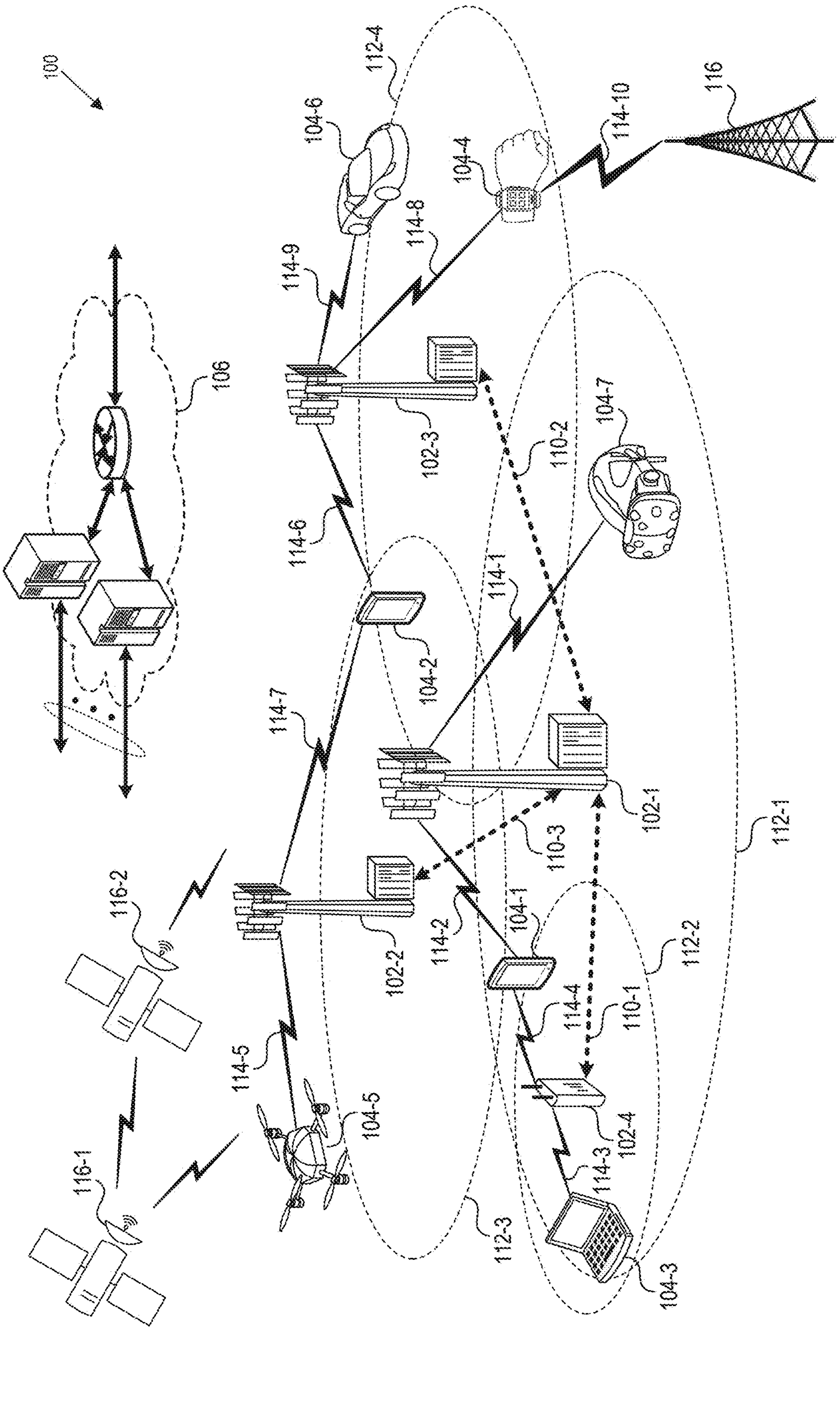
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed herein are systems and related methods for generating personalized user interface (UI) workflows to streamline user experience (UX) design and implementation processes. The disclosed system dynamically evaluates user preference information from detected user activity on UI platforms to generate custom interface workflows (e.g., connected and/or linked interface pages) via leveraging LLMs to create personalized interface elements and navigation structures.

The disclosed system can determine user context profiles based on recorded user engagement within a UI platform. As an illustrative example, the disclosed system can actively monitor user behavior on available interfaces of the UI platform (e.g., selection of specific UI elements, frequently used services, etc.) to generate personalized user metadata indicative of user preferences and/or intent on the platform (e.g., target usage of interfaces and/or services). Based on a user context profile, the disclosed system can automatically generate a personalized interface workflow from existing interface templates (e.g., standard interface pages, standard page connections) that aims to satisfy the needs and preferences of the individual user.

In some aspects, the disclosed system can configure an LLM to define custom UI elements (e.g., buttons, labels, etc.) for the individual user based on a corresponding user context profile. For example, the disclosed system can extract historical user activity on a UI platform (e.g., types of services used, frequently used interactable elements, etc.) to submit a custom prompt to the LLM for generating an output response (e.g., text string) describing a unique combination of UI element characteristics (e.g., background color, font size, location, API connections, etc.). In some implementations, the custom prompt can be further configured to elicit a structured output response (e.g., JSON format) from the LLM that enables compatibility with programmatic frameworks.

In other aspects, the disclosed system can configure an LLM to define custom interface arrangements (e.g., connections between pages) of custom UI elements and/or pages based on a user context profile. As an example, the disclosed system can submit a custom prompt comprising a predicted user need (e.g., intended service usage) and a detailed description of available custom UI elements (e.g., buttons, user input elements, etc.) to the LLM for generating an output response that describes a unique interface page layout for arranging the custom UI elements. In another example, the disclosed system can submit a custom prompt comprising user preference metadata and a detailed description of available custom interface pages to the LLM for generating an output response that describes a unique set of navigation links (e.g., buttons, API actions, etc.) between the interface pages.

In some implementations, the disclosed system can include an iterative feedback mechanism that enables supervising users to preview, revise, and/or approve custom UI workflows generated using an LLM as described above. For example, the disclosed system can display a generated custom UI workflow onto an external monitor from which a supervising user can submit feedback (e.g., direct revisions of interface element properties, additional descriptions and/or characteristics of target workflow) for generating an updated UI workflow. As such, the disclosed system can submit an updated prompt comprising the supervisory feedback to the LLM model for generating an output response that describes an updated combination of UI elements and/or navigation arrangements of interface pages. Accordingly, the disclosed system can iteratively repeat the above-described procedure to receive additional feedback from the supervising user until an approval of the latest custom UI workflow is obtained. In additional or alternative implementations, the disclosed system can include a self-maintenance mechanism for seamlessly updating dynamic functionalities (e.g., API hooks, user interactable connections, etc.) for the custom UI workflows.

In contrast, existing systems typically employ a standardized approach for implementing a UI/UX interface workflow for digital applications (e.g., a website, application portal, etc.). However, application users typically have unique behaviors, preferences, and individualized needs (e.g., usage of different services). Since standardized interface workflows are inherently designed for a general audience, they often fail to accommodate the unique individual preferences of users. For example, application users typically report a dissatisfactory experience and often find themselves wasting valuable time attempting to complete their intended tasks (e.g., use an application service, navigate to a particular page, etc.) via the standard interface workflow. In some cases, the only available methods of recourse for application users are to either abandon the application altogether or go through a slow troubleshooting process with a customer support technician. To further compound this issue, design and implementation of a UI/UX interface workflow can be an expensive process that often requires considerable time, resources, and talent spanning across several disciplines such as marketing, research, design, customer experience segmentation, and technical development. As a result, these and other problems of invariant standard UI/UX workflows can significantly diminish the overall user experience and place additional undue burden on customer support teams, negatively impact telecommunication service providers, third parties, and so forth.

Accordingly, there is a need for technologies that overcome the foregoing problems and provide additional benefits that ensure customers have a positive interaction with digital applications. For example, there is a need for a robust system that can generate custom interface workflows that adapts application content to match preferences (e.g., personalized recommendations) and individual requirements of each end user. Additionally, there is a need for a smart system that can simplify navigation (e.g., interconnections between pages) within interface workflows to enable users to seamlessly traverse the application.

Advantages of the disclosed technology include a robust automation process for generating UI/UX interface workflows, such as by leveraging LLMs to select custom UI interface element properties corresponding to a user context profile. As a result, the disclosed technology can minimize overall design and implementation costs of generating interface workflows while reducing necessary manual labor to supervisory and refinement roles. Furthermore, the disclosed technology can intelligently personalize application content and generate custom interface workflows in real time to match the needs and preferences of end users.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Interface Design System

Figure 2:
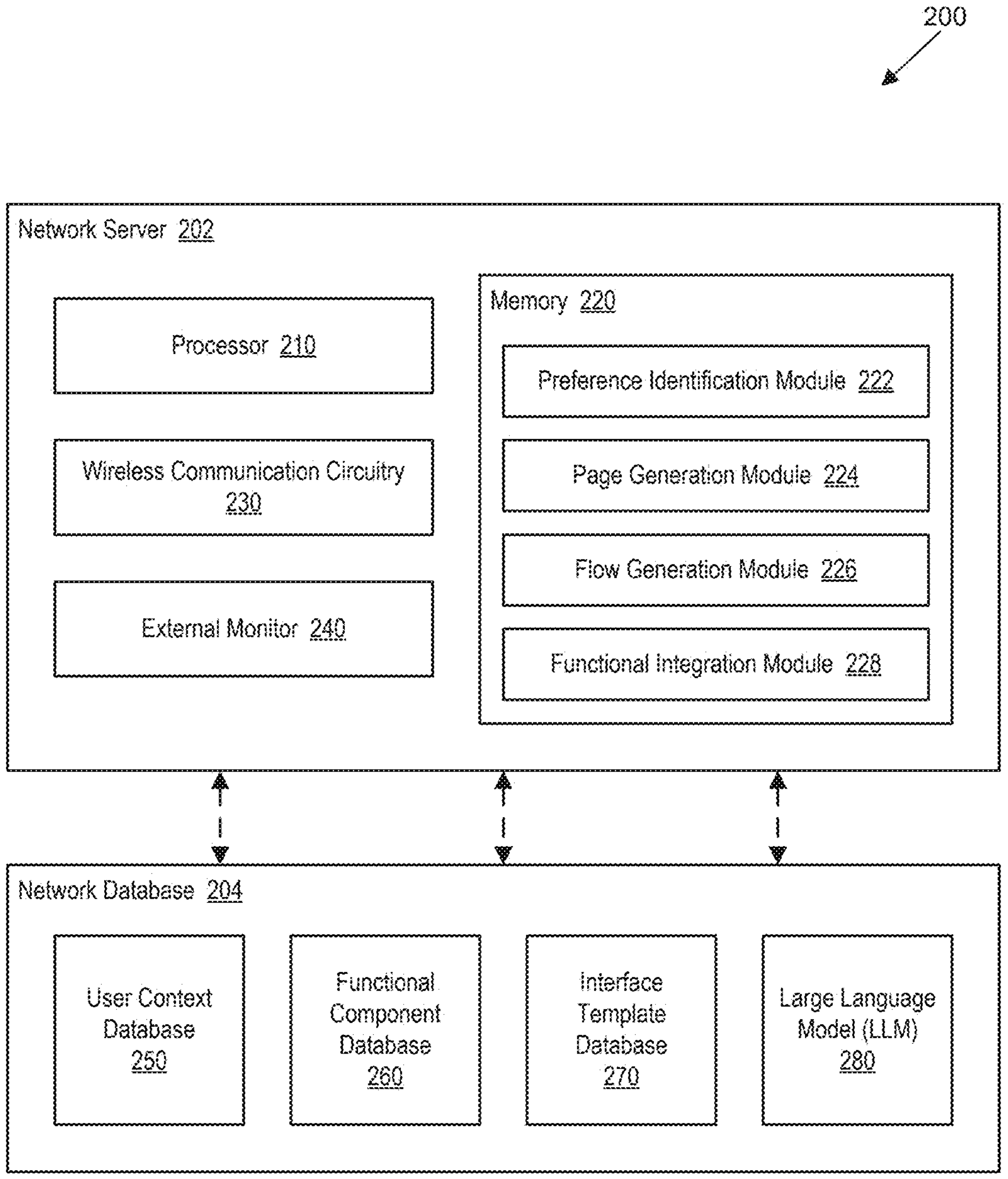
FIG. 2 is a block diagram that illustrates an interface design system that can implement aspects of the present technology.

FIG. 2 is a block diagram that illustrates an interface design system 200 that can implement aspects of the present technology. The components shown in FIG. 2 are merely illustrative, and well-known components are omitted for brevity. As shown, the network server 202 includes a processor 210, a memory 220, a wireless communication circuitry 230, and an external monitor 240. The network server 202 can use the wireless communication circuitry 230 to establish wireless communication channels with other computing devices (e.g., user equipment devices). The processor 210 can have generic characteristics similar to general-purpose processors, or the processor 210 can be an application-specific integrated circuit (ASIC) that provides arithmetic and control functions to the network server 202. While not shown, the processor 210 can include a dedicated cache memory. The processor 210 can be coupled to all components of the network server 202, either directly or indirectly, for data communication. Further, the processor 210 of the network server 202 can be communicatively coupled to a network database 204 that is hosted alongside the network server 202 on the telecommunications network 106. As shown, the network database 204 can include a user context database 250, a functional component database 260, an interface template database 270, and an LLM 280.

The memory 220 can be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 210, the memory 220 can also store data generated by the processor 210 (e.g., when executing the modules of an optimization platform). In additional or alternative embodiments, the processor 210 can store temporary information onto the memory 220 and store long-term data onto the network database 204. The memory 220 is merely an abstract representation of a storage environment. Hence, in some embodiments, the memory 220 is comprised of one or more actual memory chips or modules.

As shown in FIG. 2, modules of the memory 220 can include a preference identification module 222, a page generation module 224, a flow generation module 226, and a functional integration module 228. Other implementations of the network server 202 include additional, fewer, or different modules, or distribute functionality differently between the modules. As used herein, the term "module" refers broadly to software components, firmware components, and/or hardware components. Accordingly, the modules 222, 224, 226, 228 could each be comprised of software, firmware, and/or hardware components implemented in, or accessible to, the network server 202.

The preference identification module 222 can be configured to generate user context profiles for end users of an application hosted by the network server 202. For example, the preference identification module 222 can generate a user-specific context profile based on metadata information corresponding to user activity on the application. In some implementations, the metadata information can comprise user input data (e.g., user submitted information) and/or recorded user activity history on the application platform, such as user billing history, data associated with a telecommunications service, family account inspection, voice usage patterns, user purchase history, and/or other online activities (e.g., SMS, email, interaction with application events). Furthermore, the user context profile can comprise user demographic information (e.g., age, race, gender, disability, etc.), consumer behavior, engagement with different application services, feedback and sentiment analysis results, and/or preferences indicated via surveys or interactions from the application. The preference identification module 222 can store and/or update user context profiles at the user context database 250.

In additional or alternative embodiments, the user context profiles can comprise a set of preference indicators (e.g., representative of interface usage intents) associated with popular application services, interface elements, page layouts, and/or interface workflows by a corresponding user. For example, the preference identification module 222 can record frequencies at which a select user interacts with each available service, interface element, page layout, and/or workflow available in the application.

In other implementations, the user context profiles can comprise metadata information captured via external sources. For example, the preference identification module 222 can update a user context profile based on user activity information (e.g., income levels, internet browsing interests, spending habits outside of telecommunications services, social media interactions, etc.) obtained from external data sources. In additional or alternative implementations, the user context profiles can comprise real-time user metadata, such as a geolocation of a user equipment device actively used by an end user.

The preference identification module 222 can generate user context profiles in absence of user activity on the application (e.g., offline analysis) and update existing user context profiles before detection of new user activity. In other implementations, the preference identification module 222 can also update user context profiles in response to detected user activities (e.g., user log in, interaction with one or more interface elements, invocation of an API functionality) from the wireless communication circuitry 230.

In additional or alternative implementations, the preference identification module 222 can retrieve a user context profile associated with a select user at the request of another module of the network server 202 and/or processes. In some implementations, the preference identification module 222 can further filter metadata information from a user context profile to only include information relevant to a particular service or process. As an illustrative example, the preference identification module 222 can select a subset of preference indicators from a user context profile that are associated with the specified service.

In other implementations, the preference identification module 222 can generate a ranked order (e.g., priority order) of user preference indicators representative of a probabilistic distribution of intended usage of application services, interfaces, and/or workflows. For example, the preference identification module 222 can submit a prompt including contextual information derived from the user context profile to an LLM 280 for outputting a response that ranks and orders preference indicators for the user.

The page generation module 224 can be configured to generate custom page layouts based on approximate user preferences. For example, the page generation module 224 can retrieve a user context profile from the preference identification module 222 to selectively pick, configure, and arrange interface elements onto a custom page layout for the end user. In some implementations, the page generation module 224 can select template interface elements (e.g., predefined interface elements) stored in the interface template database 270 for generating the custom page layout. The template interface elements can include a predetermined styling (e.g., size, font, color, etc.), image, video, and/or hyperlink. Similarly, the page generation module 224 can be configured to retrieve a set of user-relevant dynamic content (e.g., user interactable elements, API functionality) from the functional integration module 228 and selectively add one or more user-relevant dynamic content onto the custom page layout. In other implementations, the page generation module 224 can use existing page layouts stored on the interface template database 270 for generating the custom page layouts. In additional or alternative implementations, the page generation module 224 can dynamically update existing page layouts in response to detecting real-time user activity (e.g., interactions with application services, user log in, etc.) and/or significant modification to dynamic content (e.g., API functions).

In some implementations, the page generation module 224 can generate custom page layouts based on recommendations generated via LLMs. For example, the page generation module 224 can submit a custom prompt comprising additional details of a user context profile, user-relevant dynamic content (e.g., from the functional integration module 228), and/or existing page layouts stored in the interface template database 270 to an LLM 280 for generating an output response describing custom page elements and/or characteristics (e.g., size, font, etc.). Based on the description, the page generation module 224 can configure a set of custom interface elements for generating the custom page layout. Additionally, the page generation module 224 can submit a custom prompt to the LLM 280 for generating a response describing a custom arrangement (e.g., locations) of interface elements on a page layout. Based on the recommendation, the page generation module 224 can selectively place each custom interface element onto unique locations on an interface page to create a custom page layout. In additional or alternative implementations, the page generation module 224 can submit a refined prompt to the LLM 280 for generating a standardized response format that can be read programmatically (e.g., JSON).

In other implementations, the page generation module 224 can generate a revised custom page layout based on feedback received via an external monitor 240. For example, the page generation module 224 can generate custom page elements and/or layout recommendations from the LLM 280 using a refined prompt that includes additional details from the feedback information. Based on the refined recommendations, the page generation module 224 can generate an updated custom page layout. In some implementations, feedback information can comprise text-based descriptions and/or direct source code of target interface elements.

In some implementations, the page generation module 224 can be configured to selectively identify existing page layouts stored on the interface template database 270 based on user preference information. For example, the page generation module 224 can receive a ranked order of user preference indicators from the preference identification module 222 and identify a set of existing page layouts from the interface template database 270 that are most relevant to the ranked order of user preference indicators. In some implementations, the page generation module 224 can also generate a ranked order of page layouts from the identified set of existing page layouts based on similarity and/or relevance of each page layout to the ranked user preference indicators.

The flow generation module 226 can be configured to generate custom interface workflow based on custom page layouts generated via the page generation module 224. For example, the flow generation module 226 can select template interface workflows (e.g., predefined arrangement of page layouts) stored in the interface template database 270 for generating the custom interface workflow. The template interface workflow can include a predetermined arrangement (e.g., element embedded navigation links) for connecting a set of custom page layouts. In additional or alternative implementations, the flow generation module 226 can dynamically update existing interface workflows (e.g., navigation arrangements) in response to detecting real-time user activity (e.g., interactions with application services, user log in, etc.) and/or significant modification to dynamic content (e.g., API functions).

In some implementations, the flow generation module 226 can generate custom interface workflows based on recommendations generated via LLMs. For example, the flow generation module 226 can submit a custom prompt comprising additional details of a user context profile, a set of custom page layouts (e.g., from the page generation module 224), and/or existing interface workflows stored in the interface template database 270 to an LLM 280 for generating an output response describing custom arrangements (e.g., order of pages, navigation link mapping of specific page elements) of the custom page layouts. Based on the description, the flow generation module 226 can selectively create interpage navigation links (e.g., a hyperlink, a navigation API function, etc.) between at least two custom page layouts to create a custom interface workflow. In additional or alternative implementations, the flow generation module 226 can submit a refined prompt to the LLM 280 for generating a standardized response format that can be read programmatically (e.g., JSON).

In other implementations, the flow generation module 226 can generate a revised custom interface workflow based on feedback received via an external monitor 240. For example, the flow generation module 226 can generate custom arrangement recommendations for page layouts from the LLM 280 using a refined prompt that includes additional details from the feedback information and a set of revised page layouts generated by the page generation module 224. Based on the refined recommendations, the flow generation module 226 can generate an updated custom interface workflow. In some implementations, feedback information can comprise text-based contextual descriptions, corrective user preference information, and/or direct source code of target interface elements.

In some implementations, the flow generation module 226 can be configured to selectively arrange a ranked set of page layouts ordered according to user preference information. For example, the flow generation module 226 can arrange a ranked order of page layouts received from the page generation module 224 such that page layouts corresponding to a higher rank, or priority, is more accessible to an end user. In particular, the flow generation module 226 can arrange the ranked order of page layouts such that page layouts with higher ranks are sequentially presented before page layouts with lower ranks. In other embodiments, the flow generation module 226 can generate an interface workflow that arranges standardized template page layouts and custom page layouts together into a single cohesive interface workflow.

The functional integration module 228 can be configured to determine relevant dynamic content (e.g., API functions, user input features) for an end user based on a corresponding user context profile. For example, the functional integration module 228 can identify dynamic content stored in the functional component database 260 based on user preference indicators of a user context profile for an end user. In some implementations, the functional integration module 228 can be configured to propagate updates (e.g., backend technical modifications) applied to select dynamic content (e.g., API). For example, the functional integration module 228 can dynamically update older versions of dynamic content stored on the functional component database 260. Additionally, the functional integration module 228 can query the LLM 280 to identify specific interface elements, page layouts, and/or workflows that are affected by the propagated updates to the select dynamic content.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 3:
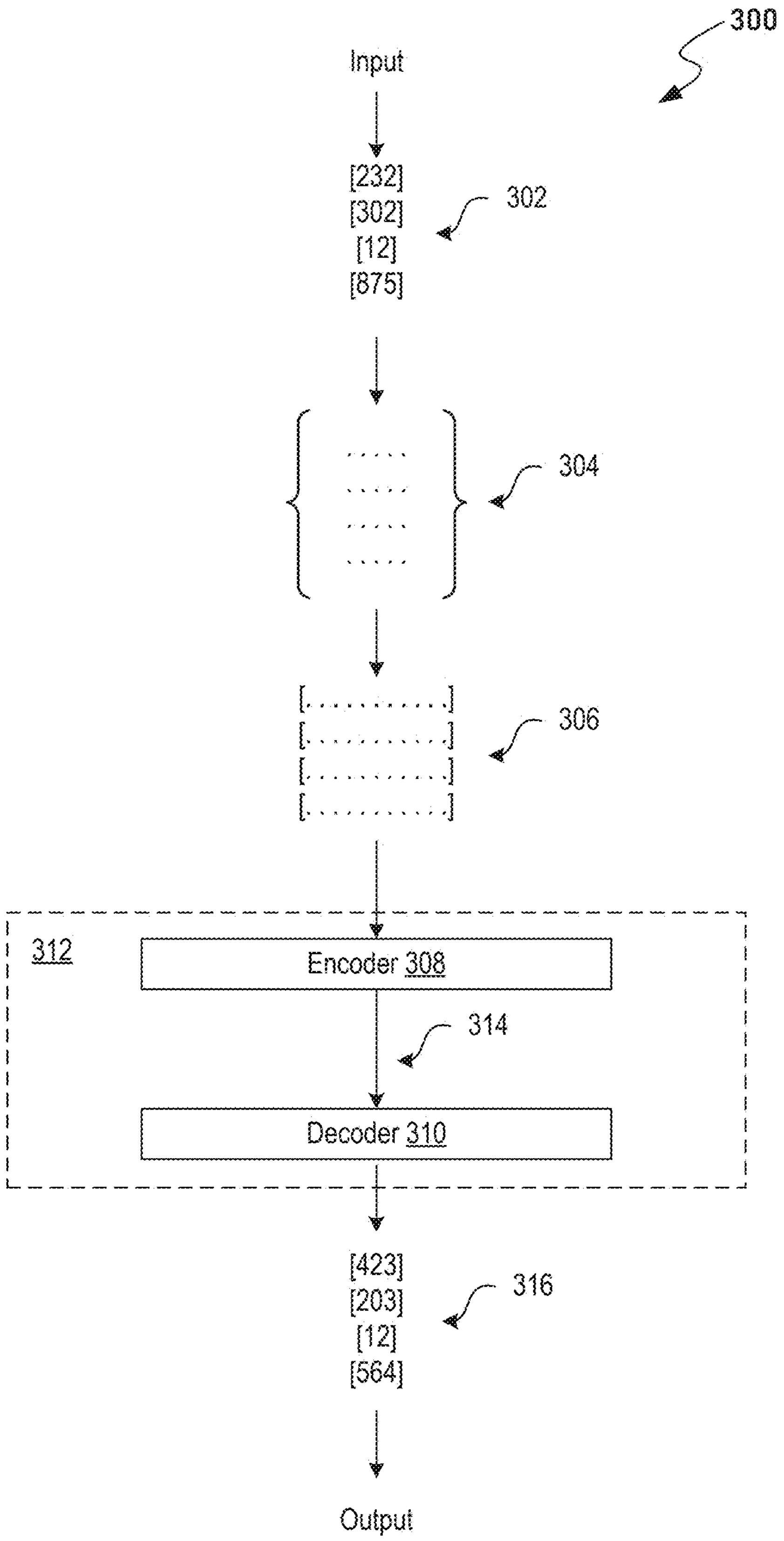
FIG. 3 is a block diagram of an example transformer in some implementations of the present technology.

FIG. 3 is a block diagram of an example transformer 312. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as RNN-based language models.

The transformer 312 includes an encoder 308 (which can comprise one or more encoder layers/blocks connected in series) and a decoder 310 (which can comprise one or more decoder layers/blocks connected in series). Generally, the encoder 308 and the decoder 310 each include a plurality of neural network layers, at least one of which can be a self-attention layer. The parameters of the neural network layers can be referred to as the parameters of the language model.

The transformer 312 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 312 is trained to perform certain functions on other input formats than natural language input. For example, the input can include objects, images, audio content, or video content, or a combination thereof.

The transformer 312 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 2 illustrates an example of how the transformer 312 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 3, a short sequence of tokens 302 corresponding to the input text is illustrated as input to the transformer 312. Tokenization of the text sequence into the tokens 302 can be performed by some pre-processing tokenization module such as, for example, a byte-pair encoding tokenizer (the "pre" referring to the tokenization occurring prior to the processing of the tokenized input by the LLM), which is not shown in FIG. 2 for simplicity. In general, the token sequence that is inputted to the transformer 312 can be of any length up to a maximum length defined based on the dimensions of the transformer 312. Each token 302 in the token sequence is converted into an embedding vector 306 (also referred to simply as an embedding 306). An embedding 306 is a learned numerical representation (such as, for example, a vector) of a token that captures some semantic meaning of the text segment represented by the token 302. The embedding 306 represents the text segment corresponding to the token 302 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 306 corresponding to the "write" token will be closer to another embedding corresponding to the "jot down" token in the vector space as compared to the distance between the embedding 306 corresponding to the "write" token and another embedding corresponding to the "summary" token.

The vector space can be defined by the dimensions and values of the embedding vectors. Various techniques can be used to convert a token 302 to an embedding 306. For example, another trained ML model can be used to convert the token 302 into an embedding 306. In particular, another trained ML model can be used to convert the token 302 into an embedding 306 in a way that encodes additional information into the embedding 306 (e.g., a trained ML model can encode positional information about the position of the token 302 in the text sequence into the embedding 306). In some examples, the numerical value of the token 302 can be used to look up the corresponding embedding in an embedding matrix 304 (which can be learned during training of the transformer 312).

The generated embeddings 306 are input into the encoder 308. The encoder 308 serves to encode the embeddings 306 into feature vectors 314 that represent the latent features of the embeddings 306. The encoder 308 can encode positional information (i.e., information about the sequence of the input) in the feature vectors 314. The feature vectors 314 can have very high dimensionality (e.g., on the order of thousands or tens of thousands), with each element in a feature vector 314 corresponding to a respective feature. The numerical weight of each element in a feature vector 314 represents the importance of the corresponding feature. The space of all possible feature vectors 314 that can be generated by the encoder 308 can be referred to as the latent space or feature space.

Conceptually, the decoder 310 is designed to map the features represented by the feature vectors 314 into meaningful output, which can depend on the task that was assigned to the transformer 312. For example, if the transformer 312 is used for a translation task, the decoder 310 can map the feature vectors 314 into text output in a target language different from the language of the original tokens 302. Generally, in a generative language model, the decoder 310 serves to decode the feature vectors 314 into a sequence of tokens. The decoder 310 can generate output tokens 316 one by one. Each output token 316 can be fed back as input to the decoder 310 in order to generate the next output token 316. By feeding back the generated output and applying self-attention, the decoder 310 is able to generate a sequence of output tokens 316 that has sequential meaning (e.g., the resulting output text sequence is understandable as a sentence and obeys grammatical rules). The decoder 310 can generate output tokens 316 until a special [EOT] token (indicating the end of the text) is generated. The resulting sequence of output tokens 316 can then be converted to a text sequence in post-processing. For example, each output token 316 can be an integer number that corresponds to a vocabulary index. By looking up the text segment using the vocabulary index, the text segment corresponding to each output token 316 can be retrieved, the text segments can be concatenated together, and the final output text sequence can be obtained.

In some examples, the input provided to the transformer 312 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Figure 4:
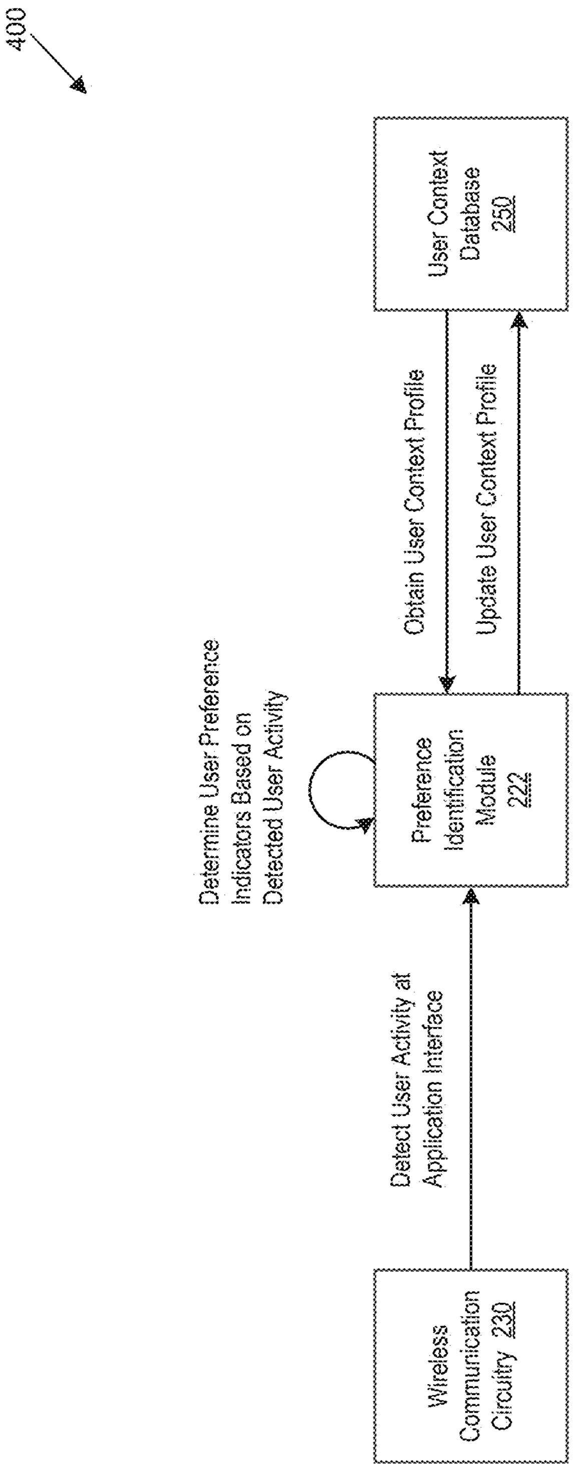
FIG. 4 is a block diagram that illustrates a process to identify user preferences in some implementations.

FIG. 4 is a block diagram that illustrates a process to identify user preferences in some implementations. The process 400 can be performed by a system (e.g., a user interface design system 200) configured to generate user context profiles for end users of an interface workflow. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

As shown in FIG. 4, the preference identification module 222 can obtain a user context profile from the user context database 250. In some implementations, the preference identification module 222 can create a new user context profile for a user not found in the user context database 250. The preference identification module 222 can search for a user context profile in response to detecting user activity of an end user on an application interface via the wireless communication circuitry 230. Based on the user context profile, the preference identification module 222 can also determine a set of user preference indicators for the respective end user. Additionally, the preference identification module 222 can identify modifications to the user context profile and store an updated user context profile to the user context database 250.

Figure 5:
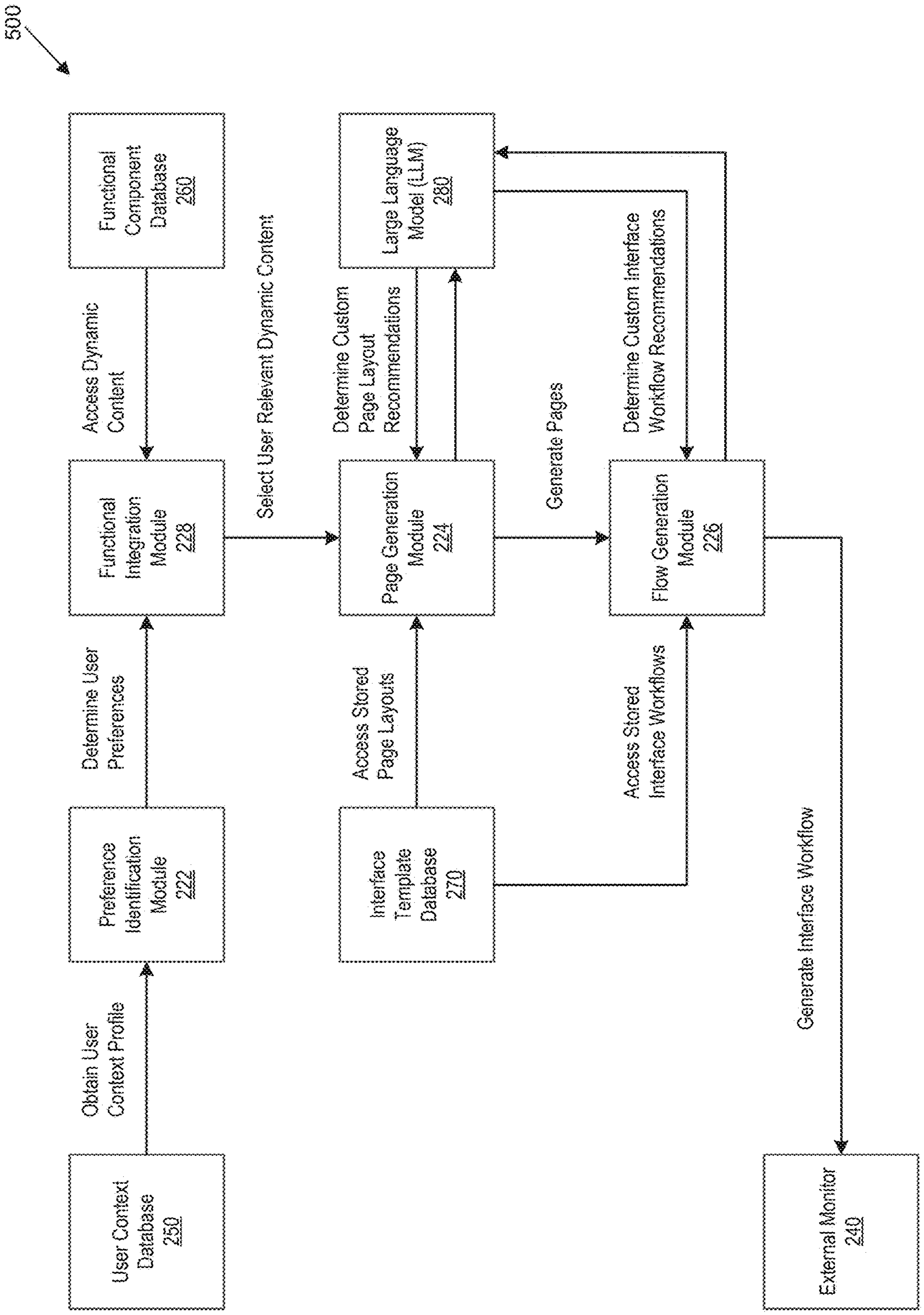
FIG. 5 is a block diagram that illustrates a process for automated user interface generation in some implementations.

FIG. 5 is a block diagram that illustrates a process for automated user interface generation in some implementations. The process 500 can be performed by a system (e.g., a user interface design system 200) configured to generate custom user interface workflows. In one example, the system includes at least one hardware processor and at least one non-transitory memory storing instructions, which, when executed by the at least one hardware processor, cause the system to perform the process 500. In another example, the system includes a non-transitory, computer-readable storage medium comprising instructions recorded thereon, which, when executed by at least one data processor, cause the system to perform the process 500.

As shown in FIG. 5, the preference identification module 222 can obtain a user context profile for an end user to determine a set of user preference indicators. Accordingly, the functional integration module 228 can use the set of user preference indicators and dynamic content accessed from the functional component database 260 to determine a set of dynamic content (e.g., functional interface elements, interactable services, API functionalities) relative to the end user. The page generation module 224 can apply an LLM 280 onto the user context profile and the set of relevant dynamic content to generate a custom page layout recommendation. Based on the recommendation, the page generation module 224 can generate a custom page layout. The flow generation module 226 can apply the LLM 280 onto the custom page layouts to generate a custom interface workflow recommendation. Based on the recommendation, the flow generation module 226 can generate a custom interface workflow. In some embodiments, the flow generation module 226 can submit the generated interface workflow to an external monitor 240 for additional processing, review, and/or approval for live publishing. In additional or alternative embodiments, the flow generation module 226 and/or the other modules can be configured to not submit an interface workflow to the external monitor if the custom page layouts and the custom interface workflow is available in the interface template database 270.

Figure 6:
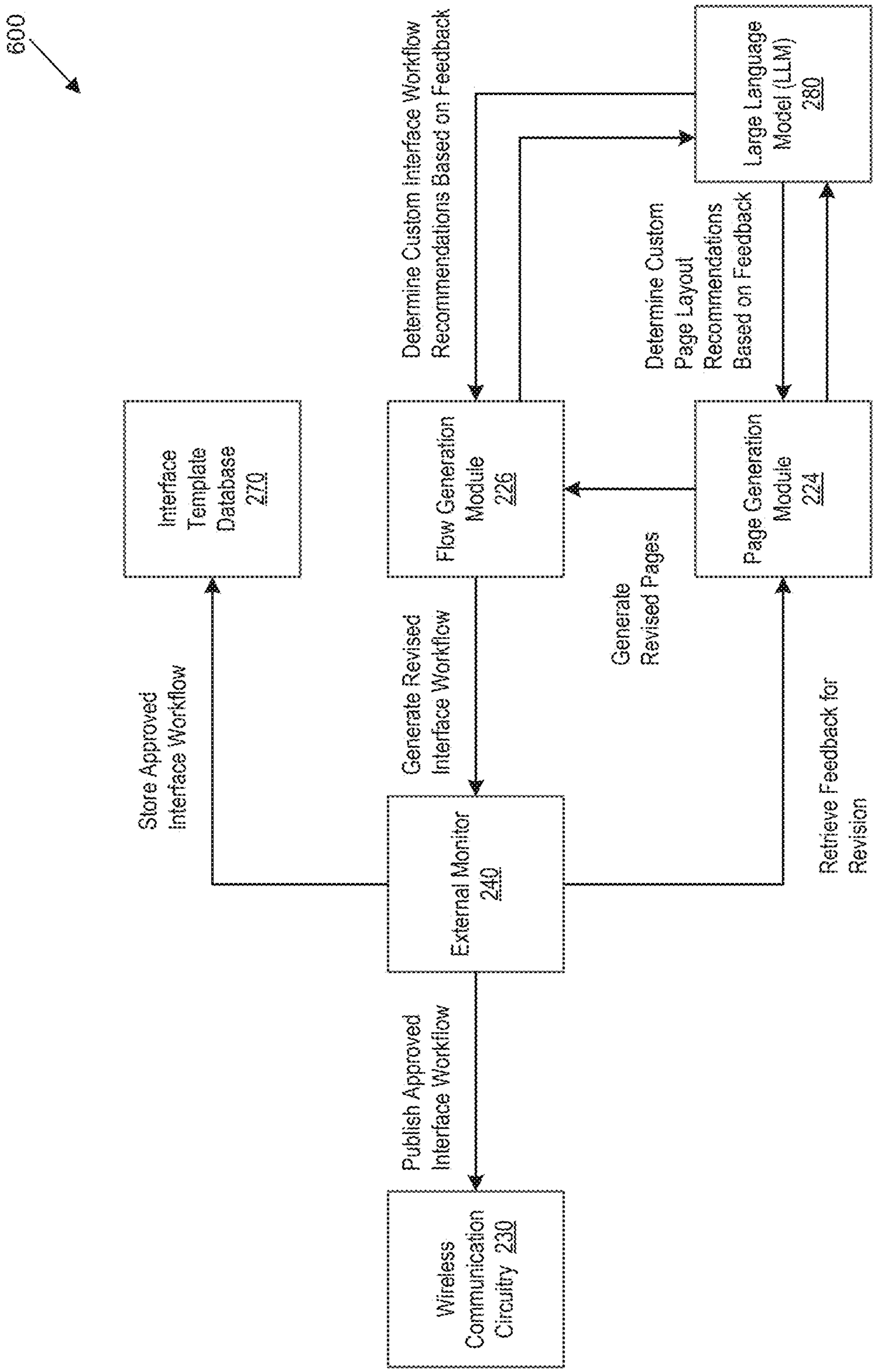
FIG. 6 is a block diagram that illustrates a process for iterative feedback in some implementations.

FIG. 6 is a block diagram that illustrates a process for iterative feedback in some implementations. The process 600 can be performed by a system (e.g., a user interface design system 200). In one example, the system includes at least one hardware processor and at least one non-transitory memory storing instructions, which, when executed by the at least one hardware processor, cause the system to perform the process 600. In another example, the system includes a non-transitory, computer-readable storage medium comprising instructions recorded thereon, which, when executed by at least one data processor, cause the system to perform the process 600.

As shown in FIG. 6, the external monitor 240 can be configured to display a generated custom interface workflow and receive feedback (e.g., revisions, approval, denial) from a supervising user regarding the custom interface workflow.

In response to receiving an approval from the supervising user, the external monitor 240 can publish the custom interface workflow onto the target application in real time. The external monitor 240 can also store the custom interface workflow onto the interface template database 270. In response to not receiving approval (e.g., requested revisions) from the supervising user, the external monitor 240 can transmit feedback information captured from the supervising user to the page generation module 224. The page generation module 224 can submit a modified prompt comprising the additional feedback information to the LLM 280 to generate revised page layout recommendations. Based on the revised page layout recommendations, the page generation module 224 can generate revised custom page layouts. Similarly, the flow generation module 226 can submit a modified prompt comprising the additional feedback information to the LLM 280 to generate revised interface workflow recommendations. Based on the revised interface workflow recommendations, the flow generation module 226 can generate revised custom interface workflows. Accordingly, the flow generation module 226 can submit the revised interface workflow to the external monitor 240 for subsequent review as described above. The above-described process can be iteratively repeated until a latest revised interface workflow is approved.

Figure 7:
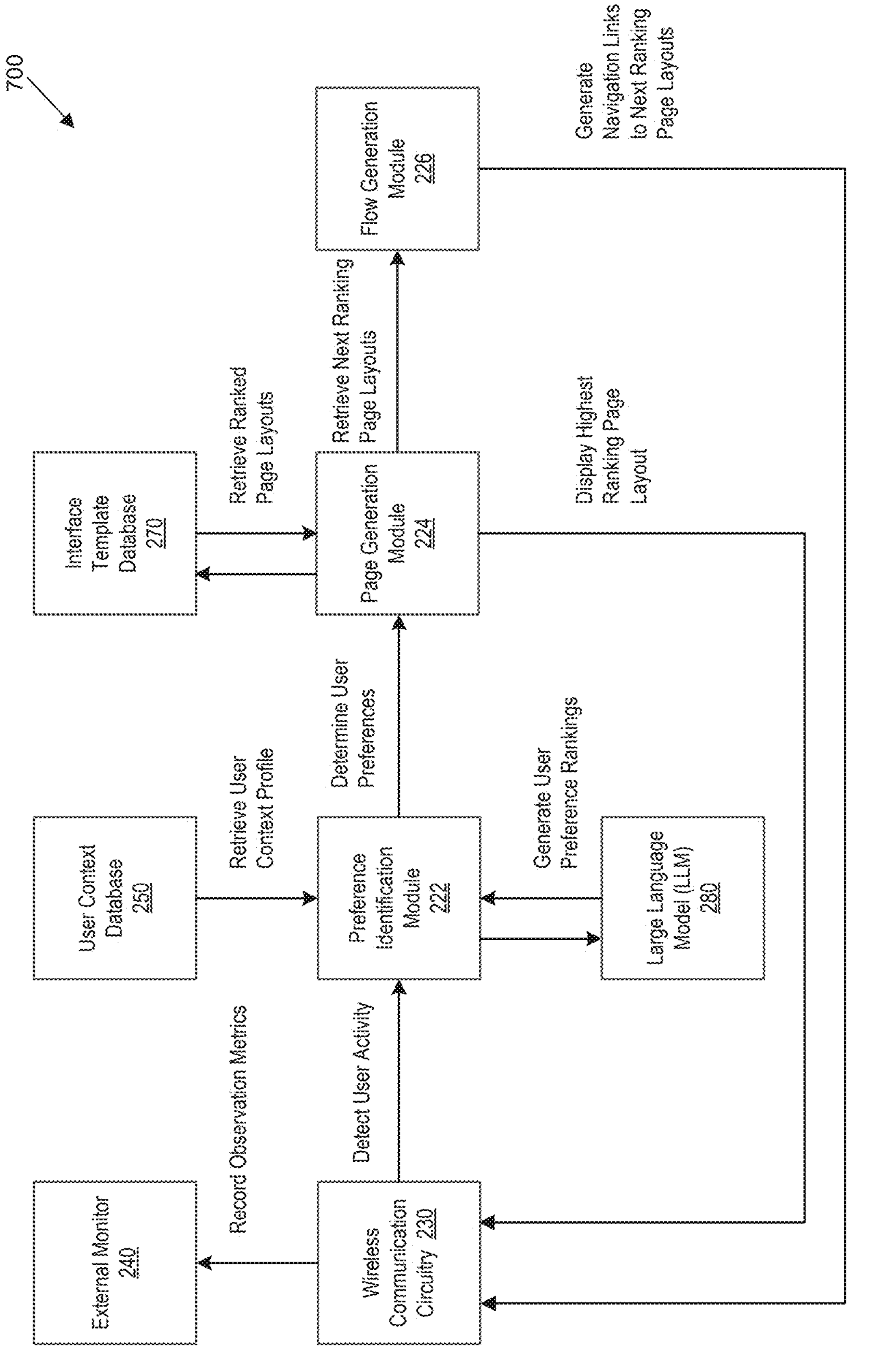
FIG. 7 is a block diagram that illustrates a process for user interface personalization in some implementations.

FIG. 7 is a block diagram that illustrates a process for user interface personalization in some implementations. The process 700 can be performed by a system (e.g., a user interface design system 200). In one example, the system includes at least one hardware processor and at least one non-transitory memory storing instructions, which, when executed by the at least one hardware processor, cause the system to perform the process 700. In another example, the system includes a non-transitory, computer-readable storage medium comprising instructions recorded thereon, which, when executed by at least one data processor, cause the system to perform the process 700.

As shown in FIG. 7, the preference identification module 222 can retrieve a user context profile from the user context database 250 in response to detected user activity from the wireless communication circuitry 230. Furthermore, the preference identification module 222 can submit a prompt comprising information from the user context profile to the LLM 280 for generating a ranked order of user preference indicators. Based on the ranked order of user preference indicators, the page generation module 224 can selectively rank page layouts stored in the interface template database 270 that correspond to higher ranked preference indicators. Based on the highest-ranking page layouts, the page generation module 224 can submit the highest-ranking page layout as a primary page layout (e.g., website main page) for display on the application via the wireless communication circuitry 230. Additionally, the flow generation module 226 can receive a set of highly ranked page layouts for generating a set of navigation links connecting the primary page layout to the highly ranked page layouts. The flow generation module 226 can use the set of navigation links to generate a custom interface workflow and submit the interface workflow to the external monitor 240 for further processing and/or evaluation. The external monitor 240 can record detected user activity with respect to the submitted interface workflow.

Figure 8:
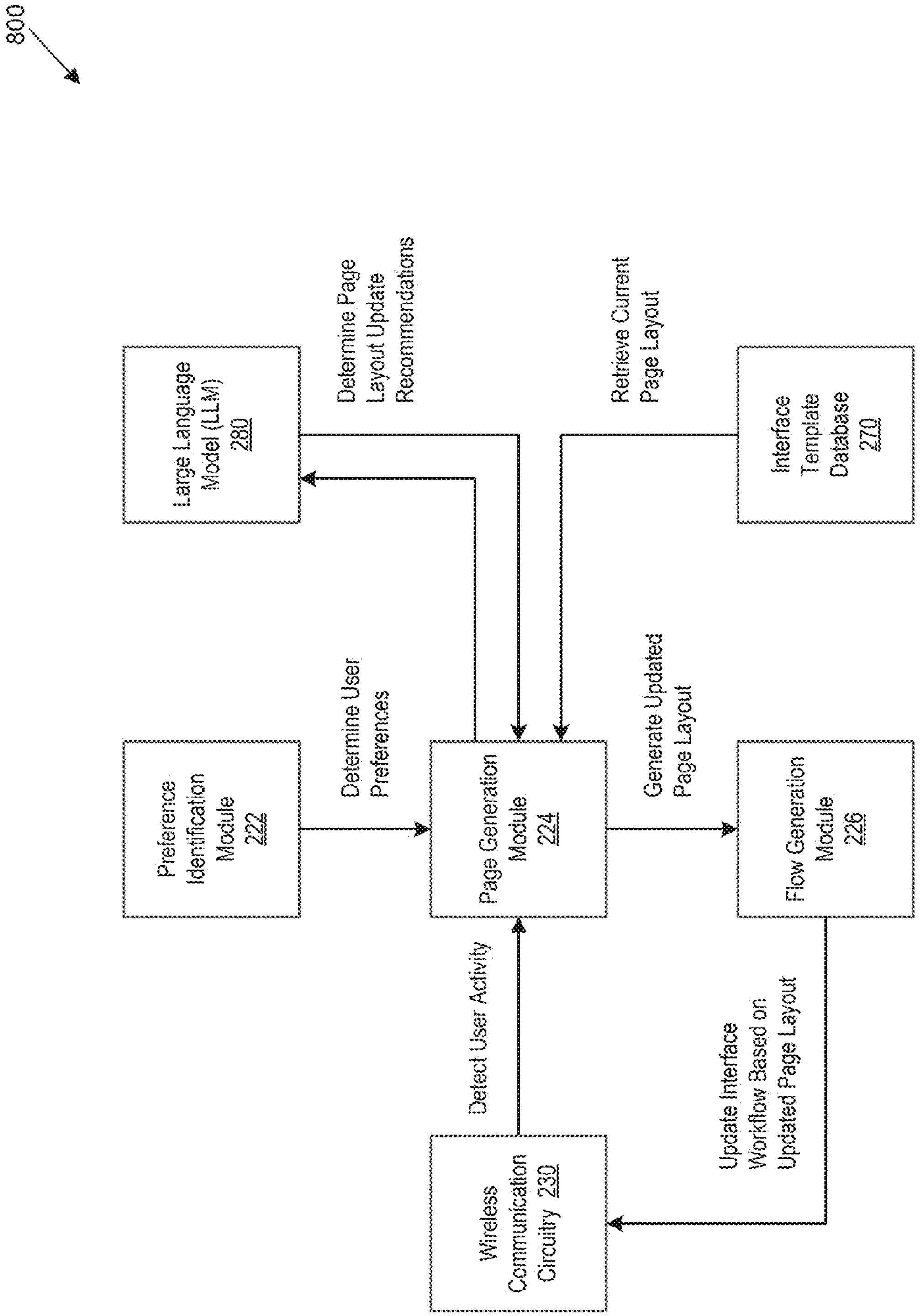
FIG. 8 is a block diagram that illustrates a process for dynamic page personalization in some implementations.

FIG. 8 is a block diagram that illustrates a process for dynamic page personalization in some implementations. The process 800 can be performed by a system (e.g., a user interface design system 200). In one example, the system includes at least one hardware processor and at least one non-transitory memory storing instructions, which, when executed by the at least one hardware processor, cause the system to perform the process 800. In another example, the system includes a non-transitory, computer-readable storage medium comprising instructions recorded thereon, which, when executed by at least one data processor, cause the system to perform the process 800.

As shown in FIG. 8, the page generation module 224 can determine a set of user preference indicators for an end user from the preference identification module 222 in response to detecting user activity for the end user via the wireless communication circuitry 230. The page generation module 224 can submit a prompt comprising user preference information from the set of user preference indicators to the LLM 280 for generating an updated page layout recommendation. Based on the recommendation, the page generation module 224 can retrieve a current version of the page layout and generate an updated page layout. Accordingly, the flow generation module 226 can generate an updated interface workflow based on the updated page layout. The flow generation module 226 can also publish the updated interface workflow to the application via the wireless communication circuitry 230 to dynamically update the application interface.

FIG. 9 is a block diagram that illustrates a process to propagate functional updates in some implementations. The process 900 can be performed by a system (e.g., a user interface design system 200). In one example, the system includes at least one hardware processor and at least one non-transitory memory storing instructions, which, when executed by the at least one hardware processor, cause the system to perform the process 900. In another example, the system includes a non-transitory, computer-readable storage medium comprising instructions recorded thereon, which, when executed by at least one data processor, cause the system to perform the process 900.

As shown in FIG. 9, the functional integration module 228 can be configured to propagate a modification to one or more dynamic content (e.g., API functionality) stored in the functional component database 260. In particular, the functional integration module 228 can update the functional component database 260 to include the modification (e.g., new content, removed content, altered content). Additionally, the functional integration module 228 can query the LLM 280 to identify specific application interface dependencies likely to be affected by the modification to the one or more dynamic content. Accordingly, the page generation module 224 can submit an updated prompt comprising the identified application interface dependencies to the LLM 280 for generating an updated page layout recommendation. Based on the recommendation, the page generation module 224 can retrieve the current page layout from the interface template database 270 and generate an updated page layout. The flow generation module 226 can generate an updated interface workflow based on the updated page layout. The flow generation module 226 can also submit the updated interface workflow to the external monitor 240 for further review, revisions, and/or approval by a supervising user.

Figure 10:
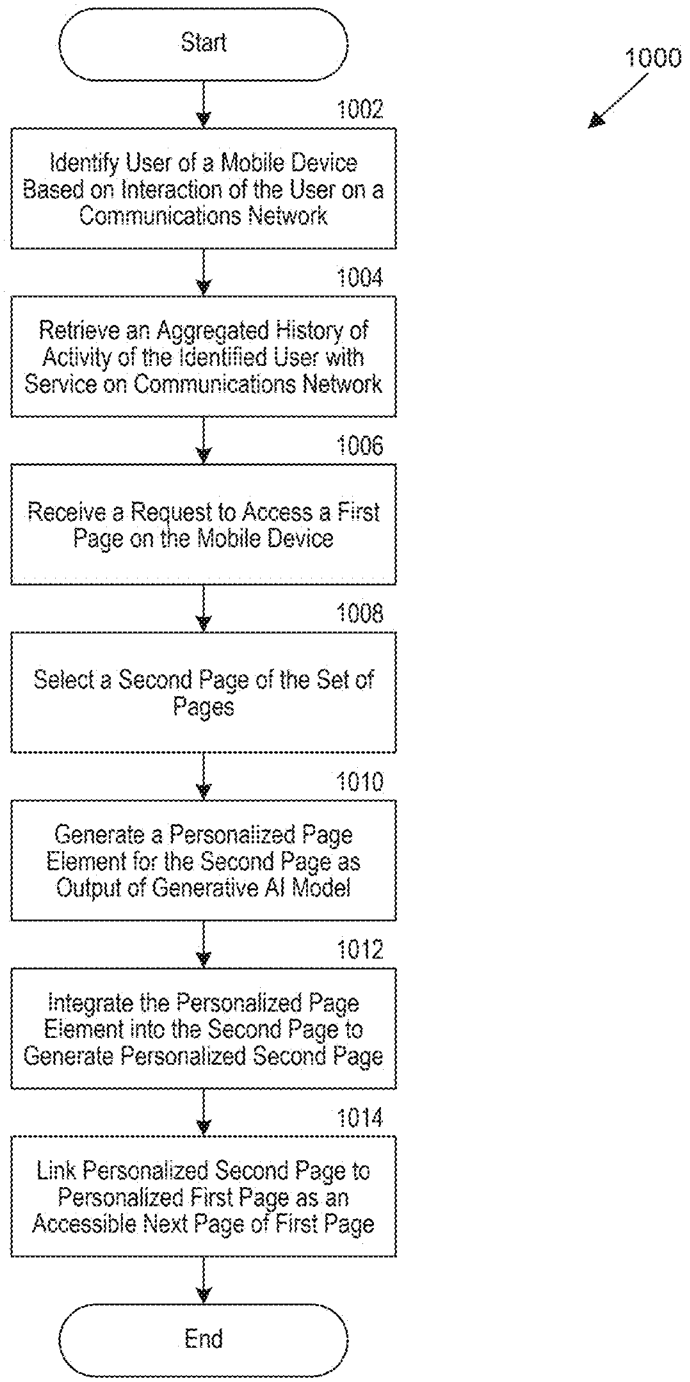
FIG. 10 is a flow diagram that illustrates a process to generate personalized user interfaces in some implementations.

FIG. 10 is a flow diagram that illustrates a process to generate personalized user interfaces in some implementations. The process 1000 can be performed by a system (e.g., a user interface design system 200) configured to dynamically customize user interface workflows based on user preference information. In one example, the system includes at least one hardware processor and at least one non-transitory memory storing instructions, which, when executed by the at least one hardware processor, cause the system to perform the process 1000. In another example, the system includes a non-transitory, computer-readable storage medium comprising instructions recorded thereon, which, when executed by at least one data processor, cause the system to perform the process 1000.

At 1002, the system can identify a user of a mobile device based on an interaction of the user on a communications network such that the interaction includes an input to a user interface on a mobile device for a service provided over the communications network. In some implementations, the communications network can be a telecommunications network. In other implementations, the communications network can be a computer network. Additionally, or alternatively, the user can be a subscriber of the telecommunications network. Further, the service provided over the communications network can be an internet service.

At 1004, the system can retrieve an aggregated history of activity of the user with the service on the communications network from a database based on the identified user. In some implementations, the aggregate history of activity of the user can include at least one attribute that is indicative of a preference of the user, content that is relevant to the user, and/or a need by the user from the service.

At 1006, the system can receive a request to access a first page on the mobile device such that the first page belongs to a set of pages that present related content for the service and are identifiable by a common root domain. In some implementations, the set of pages corresponds to webpages of a website on the internet and is accessible on the mobile device. In additional or alternative implementations, the set of pages is formed of page elements that are linkable to each other as a sequence of pages. In other implementations, the set of pages can correspond to a mobile app hosted on the mobile device and administered by an operator of the telecommunications network. For example, the system can access a set of pages of a mobile app for a billing service that personalizes the set of pages based on a billing history of the subscriber.

At 1008, the system can respond to the request to access the first page on the mobile device by dynamically generating a personalized second page and linking the personalized second page to the first page. For example, the system can dynamically select a second page from the set of pages. At 1010, the system can use the attribute of the aggregated history of activity of the user to generate a personalized page element for the second page. In some implementations, the system can generate the personalized page element as an output of a generative artificial intelligence (AI) model. In some implementations, the generative AI model can be trained for the service based on a combination including branding elements, a repository of training pages, customer feedback, behavioral activity of users of the service, and/or expert knowledge about the service. Accordingly, at 1012, the system can integrate the personalized page element into the second page to generate a personalized second page.

At 1014, the system can link the personalized second page to the first page such that the second page is accessible as a next page of the first page. For example, the system can embed a control on the first page that links to the second page such that the control, when actuated, replaces the first page with the second page on a display of the mobile device. In some implementations, the system can be configured to iteratively generate and/or link subsequent personalized pages. As an illustrative example, the system can receive an input on the second page from the user of the mobile device. In response to the input on the second page, the system can dynamically generate a personalized third page and link the personalized third page to the second page. In particular, the system can dynamically select a third page of the set of pages. Using the attribute of the aggregated history of activity of the user, the system can integrate another personalized page element generated by the generative AI model into the third page to generate a personalized third page. Accordingly, the system can link the third page to the second page such that the third page is accessible as a next page of the second page. In additional or alternative implementations, the system can dynamically link the set of pages in a particular sequence for the user based on the attribute of the aggregated history of the user such that the particular sequence omits at least one of the set of pages.

Computer System

Figure 11:
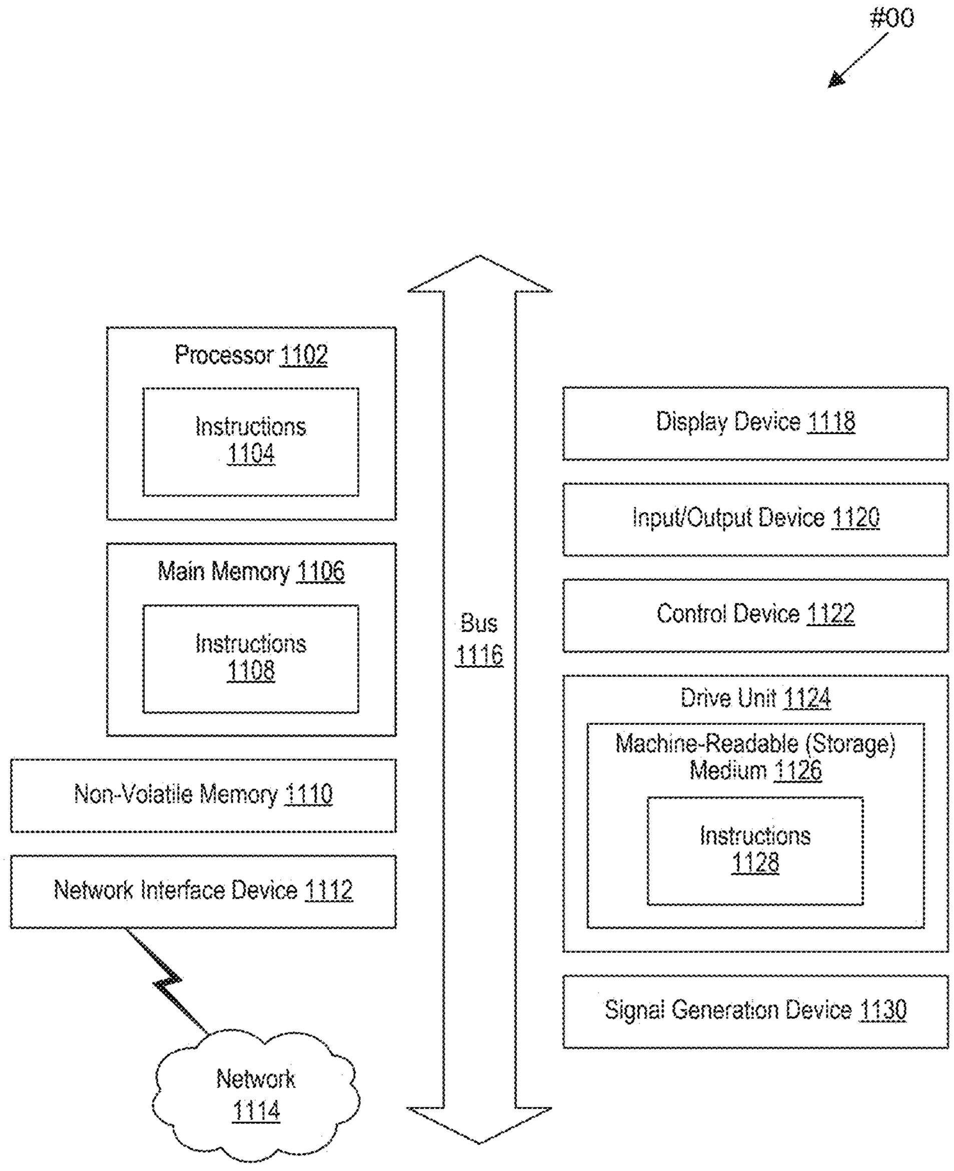
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, a video display device 1118, an input/output device 1120, a control device 1122 (e.g., keyboard and pointing device), a drive unit 1124 that includes a machine-readable (storage) medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementations, the computer system 1100 can be an embedded computer system, a system-on-chip (SOC), a single-board computer system (SBC), or a distributed system such as a mesh of computer systems, or it can include one or more cloud components in one or more networks. Where appropriate, one or more computer systems 1100 can perform operations in real time, in near real time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions when executed by at least one data processor of a system, cause the system to:
identify a user of a mobile device based on an interaction of the user on a communications network,
wherein the interaction includes an input to a user interface on a mobile device for a service provided over the communications network;
retrieve from a database, based on the identified user, an aggregated history of activity of the user with the service on the communications network;
receive a request to access a first page on the mobile device,
wherein the first page belongs to a set of pages that present related content for the service and are identifiable by a common root domain, and
wherein the set of pages is formed of page elements that are linkable to each other as a sequence of pages; and
in response to the request to access the first page on the mobile device, based on an attribute of the aggregated history of activity of the user, dynamically:
select a second page of the set of pages,
generate, as output of a generative artificial intelligence (AI) model, a personalized page element for the second page,
integrate the personalized page element into the second page to generate a personalized second page, and
link the personalized second page to the first page, the second page being accessible as a next page of the first page.

2. The non-transitory, computer-readable storage medium of claim 1, wherein the system is further caused to:
receive an input on the second page from the user of the mobile device; and
in response to the input on the second page and based on the attribute of the aggregated history of activity of the user, dynamically:
select a third page of the set of pages,
integrate another personalized page element, generated by the generative AI model, into the third page to generate a personalized third page, and
link the third page to the second page, the third page being accessible as a next page of the second page.

3. The non-transitory, computer-readable storage medium of claim 1, wherein the system is further caused to:
dynamically link the set of pages in a particular sequence for the user based on the attribute of the aggregated history of the user,
wherein the particular sequence omits at least one of the set of pages.

4. The non-transitory, computer-readable storage medium of claim 1:
wherein the communications network is a telecommunications network,
wherein the user is a subscriber of the telecommunications network,
wherein the set of pages are of a mobile app hosted on the mobile device and administered by an operator of the telecommunications network, and
wherein the mobile app is for a billing service that personalizes the set of pages based on a billing history of the subscriber.

5. The non-transitory, computer-readable storage medium of claim 1:
wherein the communications network is a computer network,
wherein the service is an internet service, and
wherein the set of pages corresponds to webpages of a website on the internet and accessible on the mobile device.

6. The non-transitory, computer-readable storage medium of claim 1, wherein dynamically creating the link between the first page and the second page comprises:
embedding a control on the first page that links to the second page,
wherein the control, when actuated, replaces the first page with the second page on a display of the mobile device.

7. The non-transitory, computer-readable storage medium of claim 1, wherein the generative AI model is trained for the service based on a combination including branding elements, a repository of training pages, customer feedback, behavioral activity of users of the service, or expert knowledge about the service.

8. The non-transitory, computer-readable storage medium of claim 1, wherein the attribute is indicative of:
a preference of the user,
content that is relevant to the user, or
a need by the user from the service.

9. A method performed by a system, the method comprising:
identifying a user of a mobile device based on an interaction of the user on a communications network,
wherein the interaction includes an input to a user interface on a mobile device for a service provided over the communications network;
retrieving from a database, based on the identified user, an aggregated history of activity of the user with the service on the communications network;
receiving a request to access a first page on the mobile device,
wherein the first page belongs to a set of pages that present related content for the service and are identifiable by a common root domain, and
wherein the set of pages is formed of page elements that are linkable to each other as a sequence of pages; and
in response to the request to access the first page on the mobile device, based on an attribute of the aggregated history of activity of the user, dynamically:
selecting a second page of the set of pages,
generating, as output of a generative artificial intelligence (AI) model, a personalized page element for the second page,
integrating the personalized page element into the second page to generate a personalized second page, and
linking the personalized second page to the first page, the second page being accessible as a next page of the first page.

10. The method performed by the system of claim 9, further comprising:
receiving an input on the second page from the user of the mobile device; and
in response to the input on the second page and based on the attribute of the aggregated history of activity of the user, dynamically:

selecting a third page of the set of pages, integrating another personalized page element, generated by the generative AI model, into the third page to generate a personalized third page, and linking the third page to the second page, the third page being accessible as a next page of the second page.

11. The method performed by the system of claim 9, further comprising:

dynamically linking the set of pages in a particular sequence for the user based on the attribute of the aggregated history of the user, wherein the particular sequence omits at least one of the set of pages.

12. The method performed by the system of claim 9:

wherein the communications network is a telecommunications network, wherein the user is a subscriber of the telecommunications network, wherein the set of pages are of a mobile app hosted on the mobile device and administered by an operator of the telecommunications network, and wherein the mobile app is for a billing service that personalizes the set of pages based on a billing history of the subscriber.

13. The method performed by the system of claim 9:

wherein the communications network is a computer network, wherein the service is an internet service, and wherein the set of pages corresponds to webpages of a website on the internet and accessible on the mobile device.

14. The method performed by the system of claim 9, wherein dynamically creating the link between the first page and the second page comprises:

embedding a control on the first page that links to the second page, wherein the control, when actuated, replaces the first page with the second page on a display of the mobile device.

15. The method performed by the system of claim 9, wherein the generative AI model is trained for the service based on a combination including branding elements, a repository of training pages, customer feedback, behavioral activity of users of the service, or expert knowledge about the service.

16. The method performed by the system of claim 9, wherein the attribute is indicative of:

a preference of the user, content that is relevant to the user, or a need by the user from the service.

17. A system comprising:

at least one hardware processor; and at least one non-transitory memory storing instructions, which, when executed by the at least one hardware processor, cause the system to:

identify a user of a mobile device based on an interaction of the user on a communications network, wherein the interaction includes an input to a user interface on a mobile device for a service provided over the communications network;

retrieve from a database, based on the identified user, an aggregated history of activity of the user with the service on the communications network;

receive a request to access a first page on the mobile device, wherein the first page belongs to a set of pages that present related content for the service and are identifiable by a common root domain, and wherein the set of pages is formed of page elements that are linkable to each other as a sequence of pages; and in response to the request to access the first page on the mobile device, based on an attribute of the aggregated history of activity of the user, dynamically:

select a second page of the set of pages, generate, as output of a generative artificial intelligence (AI) model, a personalized page element for the second page, integrate the personalized page element into the second page to generate a personalized second page, and link the personalized second page to the first page, the second page being accessible as a next page of the first page.

18. The system of claim 17 further caused to:

receive an input on the second page from the user of the mobile device; and in response to the input on the second page and based on the attribute of the aggregated history of activity of the user, dynamically:

select a third page of the set of pages, integrate another personalized page element, generated by the generative AI model, into the third page to generate a personalized third page, and link the third page to the second page, the third page being accessible as a next page of the second page.

19. The system of claim 17 further caused to:

dynamically link the set of pages in a particular sequence for the user based on the attribute of the aggregated history of the user, wherein the particular sequence omits at least one of the set of pages.

20. The system of claim 17, wherein dynamically creating the link between the first page and the second page comprises causing the system to:

embed a control on the first page that links to the second page, wherein the control, when actuated, replaces the first page with the second page on a display of the mobile device.

* * * * *